United States Patent
Morin et al.

(10) Patent No.: US 9,420,275 B2
(45) Date of Patent: Aug. 16, 2016

(54) VISUAL POSITIONING SYSTEM THAT UTILIZES IMAGES OF A WORKING ENVIRONMENT TO DETERMINE POSITION

(71) Applicant: NovAtel Inc., Calgary (CA)

(72) Inventors: Kristian Morin, Calgary (CA); Sandy Kennedy, Calgary (CA)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 475 days.

(21) Appl. No.: 13/666,358

(22) Filed: Nov. 1, 2012

(65) Prior Publication Data

US 2014/0118536 A1    May 1, 2014

(51) Int. Cl.
*H04N 7/18* (2006.01)
*H04N 17/00* (2006.01)
*H04N 5/232* (2006.01)
*G01C 21/20* (2006.01)
*H04N 1/32* (2006.01)

(52) U.S. Cl.
CPC .............. *H04N 17/002* (2013.01); *G01C 21/20* (2013.01); *H04N 1/32117* (2013.01); *H04N 5/23229* (2013.01); *H04N 7/18* (2013.01); *H04N 2201/3253* (2013.01); *H04N 2201/3254* (2013.01)

(58) Field of Classification Search
CPC . G01C 21/20; H04N 17/002; H04N 5/23229; H04N 7/18
USPC .......................................................... 348/143
See application file for complete search history.

(56) References Cited

U.S. PATENT DOCUMENTS

| 4,639,878 A | 1/1987 | Day et al. |
| 6,182,005 B1 | 1/2001 | Pilley et al. |

(Continued)

FOREIGN PATENT DOCUMENTS

EP    2321953    5/2011

OTHER PUBLICATIONS

Fabio Remondino et al., "Digital Camera Calibration Methods: Consideerations and Comparisons," IAPRS vol. XXXVI, Part 5, Dresden Sep. 25-27, 2006.

(Continued)

*Primary Examiner* — Jessica M Prince
(74) *Attorney, Agent, or Firm* — Cesari and McKenna, LLP

(57) ABSTRACT

A system determines an otherwise unknown position and orientation of a camera in a working environment, relative to an associated coordinate system, based on visually identifiable unique objects in images taken by the camera. The system utilizes a database that includes or may be updated to include position coordinates for unique objects of interest. The system identifies a plurality of objects within images taken by the camera at a given location, and enters the database either to determine position coordinates for the respective identified objects or to add position coordinates to the data base for the respective identified objects, or both. The system may also update the database to include newly identified unique objects and objects that are altered between images, to determine position and orientation of the camera in a changing environment. Sensors may be included to add additional information relative to the position and orientation of the camera.

19 Claims, 7 Drawing Sheets

(56) References Cited

U.S. PATENT DOCUMENTS

| | | | |
|---|---|---|---|
| 6,594,600 | B1 | 7/2003 | Arnoul et al. |
| 2002/0191862 | A1* | 12/2002 | Neumann ............. G06T 7/0046 382/284 |
| 2003/0133594 | A1 | 7/2003 | Sefton |
| 2008/0147730 | A1 | 6/2008 | Lee et al. |
| 2009/0180667 | A1* | 7/2009 | Mahan ................... G01S 5/163 382/103 |
| 2010/0063664 | A1* | 3/2010 | Anderson ............. G05D 1/024 701/23 |
| 2010/0066603 | A1 | 3/2010 | O'Keefe et al. |
| 2010/0318294 | A1 | 12/2010 | Rosing et al. |
| 2011/0046915 | A1 | 2/2011 | Hol et al. |
| 2011/0064312 | A1* | 3/2011 | Janky ..................... G01C 15/00 382/195 |
| 2011/0070840 | A1 | 3/2011 | Nielsen et al. |
| 2011/0153198 | A1 | 6/2011 | Kokkas et al. |
| 2012/0078510 | A1* | 3/2012 | Ma ....................... G01C 21/165 701/426 |
| 2013/0195362 | A1 | 8/2013 | Janky et al. |
| 2013/0243250 | A1 | 9/2013 | France et al. |
| 2014/0072169 | A1* | 3/2014 | Haas .................... G06T 7/0044 382/103 |

OTHER PUBLICATIONS

Tofel, Kevin C., "How to measure anything with a camera and software" [online], Feb. 6, 2007 [retrieved on May 25, 2014]. Retrieved from the Internet:,URL: http://gigaom.com/2007/02/06/how_to_measure_/>.

"iPhotoMeasure—Measure anything in a photo" [online] Jan. 13, 2008 [retrieved on May 25, 2014]. Retrieved from the Internet: <URL: https://www.youtube.com/watch?v=XV-TUIR6wDU>.

"iphotomeasure tutorial measurement" [online] Jun. 1, 2007 [retrieved on May 25, 2014], Retrieved from the Internet <URL: https://www.youtube.com/watch?v=ShhxxAEPRjU>.

"Digital Dimensioning with UPHOTOMEASURE" [online] Aug. 20, 2008 [retrieved on May 25, 2014], Retrieved from the Internet: <URL: https://www.youtube.com/watch?v=XV-TUIR6wDU>.

Trew, James "Researchers measure 3D objects using just a camera and projector, can tell if you've ironed your shirt (video)" [online] Aug. 14, 2012 [retrieved on May 25, 2005/2014]. Retrieved from the Internet: <URL: http://www.engadget.com/2012/08/14/researchers-measure-3d-objects-using-just-a-camera-and-projector/>.

International Search Report and Written Opinion mailed Apr. 23, 2014 for International Application No. PCT/CA2014/050035 filed on Jan. 20, 2014 by NOVATEL INC., 9 pages.

\* cited by examiner

VISUAL POSITIONING SYSTEM THAT UTILIZES IMAGES OF A WORKING ENVIRONMENT TO DETERMINE POSITION

BACKGROUND OF THE INVENTION

1. Field of the Invention

The invention relates generally to visual positioning systems and, more particularly, to visual positioning systems that utilize images of a working environment to determine position.

2. Background Information

Machine control systems may utilize global navigation satellite system (GNSS) receivers to determine the global position of machinery, and inertial and other sensors may be added to provide information relating to the orientation and movement of the machinery. The GNSS receivers and inertial and other sensors update the position and orientation information to aid a driver or a robotic control in navigating the machine to a desired location or along a desired route, and so forth. These systems work well in many, but not all, environments. For example, the GNSS receivers may not work well in environments that include multiple nearby sources of multipath signals and/or in environments without sufficiently clear views of the sky, such as indoors.

Other systems, such as cellular telephone systems, may determine positions utilizing triangulation with cellular towers based on signal strength and so forth. The cellular systems, however, require infrastructure that may not be available or may not operate well in the working environments of interest.

In certain working environments, such as warehouses, farm fields and so forth, accurate relative positions as opposed to global positions are sufficient to control the operation of machinery moving within the environment. Accordingly, in certain of the working environments, accurate positioning systems with little or no infrastructure may be particularly useful alone or in conjunction with global positioning systems.

SUMMARY OF THE INVENTION

A vision positioning system determines an otherwise unknown position, orientation and/or movement of respective cameras in a working environment, relative to an associated coordinate system, based on visually identifiable unique objects in images taken by the cameras. The system utilizes a database that includes or may be updated to include position coordinates for unique objects of interest identified in the images taken by the respective cameras. The system determines the position and orientation of a given camera by identifying a plurality of unique objects within one or more images taken by the camera at a given location, and entering the database to determine position coordinates for the respective identified objects that are included in the database. If any of the identified unique objects in the respective images are not included in the data base, the system also adds identifying information and position coordinates, and as appropriate, orientation information, to the data base.

BRIEF DESCRIPTION OF THE DRAWINGS

The invention description below refers to the accompanying drawings, of which.

DETAILED DESCRIPTION OF AN ILLUSTRATIVE EMBODIMENT

The system described below includes a data base that is available to multiple users of the system and which incorporates contributions from the multiple users of the system. As described in more detail below, the data base contains and/or is updated to contain object identification information and associated position coordinates, and as appropriate, orientation information, for uniquely identifiable objects in a working environment. The system may then determine the relative position and orientation of a camera operating in the environment based solely on images taken by the camera. The system may also update the database as new unique objects or altered unique objects are identified in the images of the environment and/or as more precise position and orientation information is available for the objects contained in the database. The system may operate in an initially unknown environment and populate an empty database by providing object identification information and associated relative position coordinates to the database based on images taken by cameras in unknown positions and orientations in the environment and/or in positions and orientations in the environment that are known at least in part from included GNSS receivers, inertial sensors, and so forth.

Figure 1:
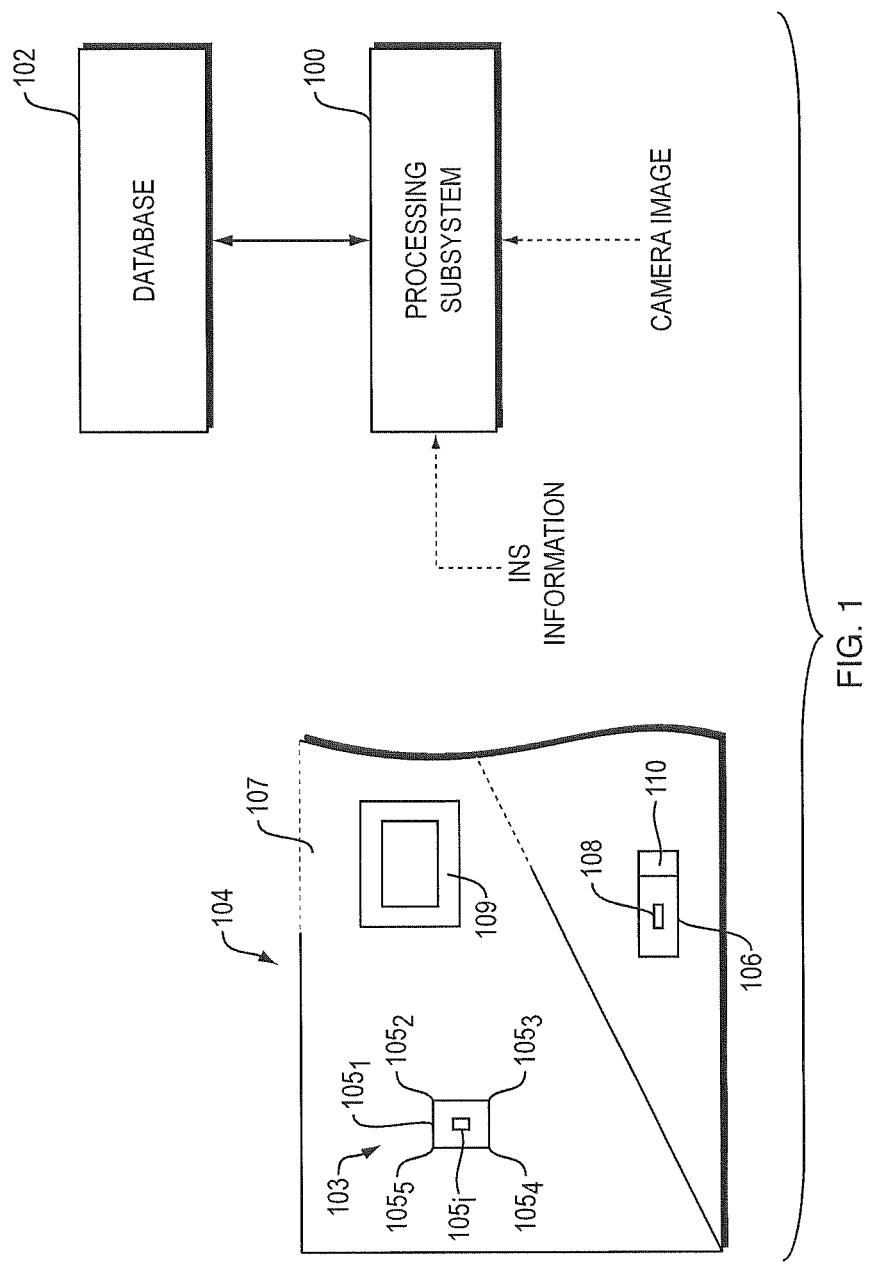
FIG. 1 is a functional block diagram that illustrates system operations.

We first describe the system operating with a data base that contains object identification information and associated position coordinates. We refer to cameras moving within the environment. As shown in FIG. 1, one or more of the cameras may be installed on machines or vehicles 106, or alternatively one or more of the cameras may be carried by people (not shown) moving within the environment. For ease of explanation we sometimes refer also to position coordinates and orientation coordinates or information either singly or collectively as "position information."

Referring now to FIG. 1, a database 102 includes identification information and position coordinates of uniquely identifiable objects 110 in a working environment 104, illustrated here as a corridor. The objects may be features, or object points, for which (x,y,z) position coordinates are known within the environment coordinate system. Alternatively, or in addition, the objects may consist of composite features, and the corresponding position information is the x, y and z coordinates of an included feature point as well as an orientation for the composite object within the environmental coordinate system. The identification of a given object corresponds to a pattern of pixels in one or more camera images taken in the working environment. A given object may be, for example, an edge 105$_1$ or a corner 105$_2$ of a light switch 103 or other item on a wall 107, or may be a side or corner of a window 109, and so forth. Alternatively, or in addition, the data base may include information relating to particular features of the object, such as color, texture, and so forth. The positions of the respective objects may be relative to a local coordinate system or relative to a global coordinate system, as appropriate.

As discussed in more detail below, the data base may contain position-related information relating to known buildings, lakes, and so forth, within the working environment. For example, the data base may include the elevation of the lake, the orientations of the sides or corner edges of the known building, and so forth.

A machine 106 operating in the working environment 104 supports a camera 108 that produces digital images of the environment from the perspective of the machine, and an inertial measurement subsystem (INS) 110 that provides information relating to the movement of the machine. The camera 108, which has a known principal distance and principle point offset and known internal characteristics attributable to, for example, lens distortion, is placed at a known location on the machine relative to a machine measurement frame, as is the INS. As discussed, the camera 108 may instead be carried by a person moving within the environment.

A processing subsystem 100 processes the images produced by the camera 108 and identifies unique objects in the images based on patterns of image pixels, as discussed in more detail below. The processor then searches the database 102, to determine if the database contains position and, as appropriate, orientation coordinates for one or more of the unique objects identified in the images. If at least 7 observations are known from the database, the relative position and orientation of the camera within the working environment can be determined. Each object in the database is associated with at least 3 observations, namely, (x,y,z) coordinates, while an observation such as a height reference for a discernable area of the environment, such as a hill or a lake, has 1 associated reference observation. Accordingly, as long as 7 observations, such as the (x,y,z) position coordinates for at least 2 of the unique objects and 1 partial object observation, such as the height reference of, for example, the lake shown in the image, can be determined from the data base, the processing system determines the relative position and orientation of the camera 108, and thus, the machine 106, within the coordinate system of the working environment. Similarly, if the position coordinates of at least 3 unique objects are known, there are at least 9 observations from which the relative position and orientation of the camera can be determined. As the machine and camera move, the INS subsystem 110, which consists of one or more inertial sensors, measures the movement and aids in the determination of a next relative position and/or orientation of the camera.

Notably, the system utilizes information relating to unique objects identified in the images, and filters out any information relative to non-unique objects. As discussed in more detail below, the system updates the data base to include information relating to newly identified unique objects in the images. The newly identified unique objects may be features that were not previously identified in the working environment, objects newly added to the environment and/or features of the environment that have been altered since the last time images were taken at the location. Further, the system updates the data base when more precise position information is available for the unique objects included therein.

Figure 2:
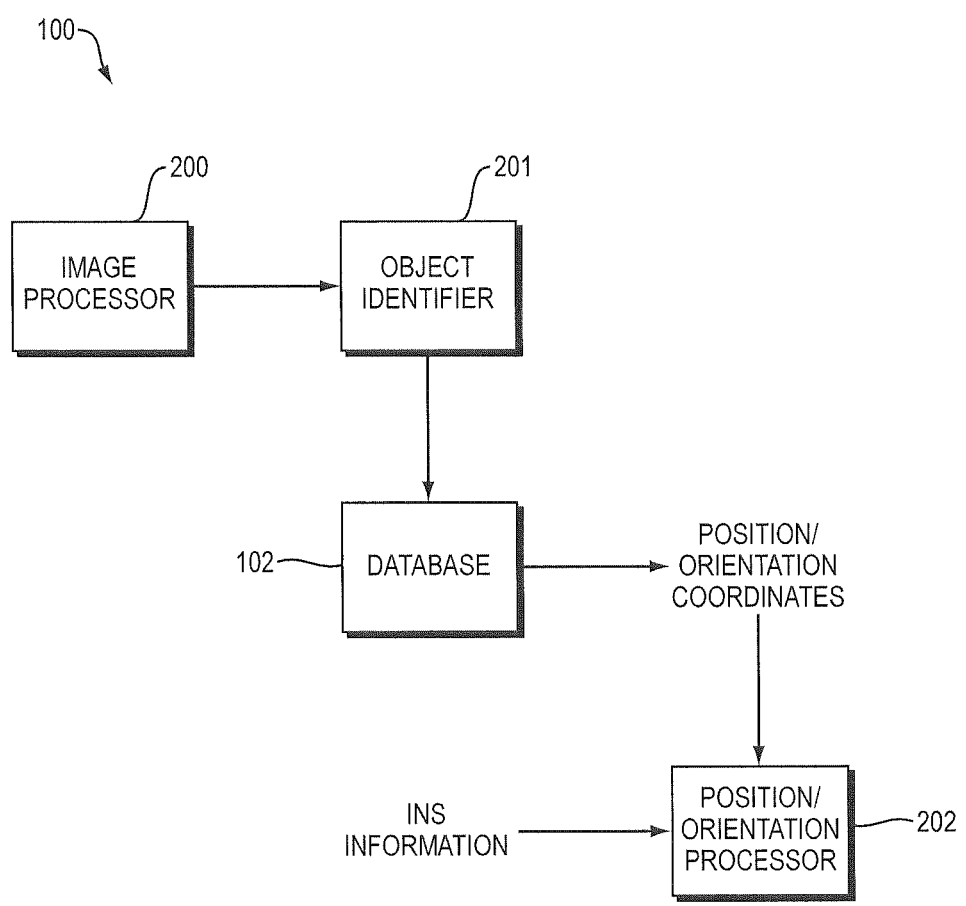
FIG. 2 is a functional block diagram of a processing subsystem of FIG. 1.

Referring also to FIG. 2, the processing subsystem 100 includes an image processor 200 that processes the images taken by the camera 108 into an array of pixels. An object identifier 201 identifies unique objects in the images based on discernable patterns in the image pixels. The object identifier groups pixels by, for example, intensity, and identifies changes in intensity that may represent object edges or corners and so forth. Alternatively or in addition, the object identifier groups the pixels by color, and identifies edges or corners of the objects also by transitions in the colors. Other attributes of the objects may be utilized alternatively or in addition, such as, the object's overall shape or outline, markings, texture, and so forth. Further, in certain environments, such as, for example, building interiors, readily identifiable unique objects, such as patterned or different color stickers, bar-coded labels, or combinations thereof, may be strategically placed in the environment as an aid to position determination. For example, the stickers may be used to readily identify floors or wings of a building, and so forth, as discussed in more detail below.

The processing subsystem 100 enters the database 102 using the information that identifies unique objects in the image and utilizes a known searching technique, such as SURF, to determine if the database contains position information for one or more of the identified unique objects. If an entry for a given identified unique object is contained in the database, the system associates the stored position and orientation coordinates with the object identified in the image. The processing system also determines if matches can be found in the database for additional objects identified in the image, and so forth. The position and/or orientation coordinates are provided to a processor 202, which determines the relative position and/or orientation of the camera using known triangulation techniques.

Figure 3:
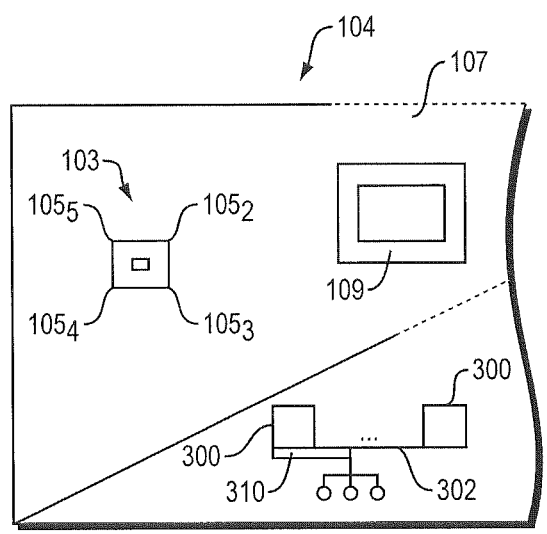
FIG. 3 is a functional block diagram that illustrates system operations.

Referring now also to FIG. 3, the database 102 may be populated by determining position and orientation coordinates for identifiable unique objects in images taken by one or more cameras 300 that are in known positions and orientations within the environment 104. In the example, the system determines position coordinates and the orientation of the respective corners $105_1$-$105_5$ of the light switch 103 and retains in the database 102 information that identifies the respective corners as particular pixel patterns in an image. As appropriate, information relating to the proximity of the corners to one another or to other identifiable unique objects may be included in the database as an identifying characteristic or attribute of the respective corner objects.

If only a single camera is utilized to populate the database, the distances from the camera to the identifiable unique objects in the environment are determined by a total station, laser ranging sub-system, or other distance measuring subsystem (not shown). If two or more cameras 300 are utilized, the distance measuring device is not required, and the distances may instead by determined in a known manner using the stereo images from the two or more cameras. In the drawing, two cameras 300 are stationed on a frame 302 of known dimensions. The frame holds the cameras in predetermined relative positions and orientations, while moving the cameras through the working environment. As discussed, inertial or other sensors 310 may be used to provide information relating to the movement of the cameras and a GNSS receiver may also be included to provide updated position information when GNSS satellite signals are available.

To populate the database 102, the cameras 300 are moved to capture images of the working environment 104 from the directions in which it is expected that machines and/or people typically move into and/or within the environment. Depending on the environment, the positions of the one or more cameras 300 are determined as they move throughout the environment by GNSS alone, GNSS in combination with INS subsystem, INS subsystem alone from a known starting position, or by other measurement apparatus (not shown) capable of measuring the movement from a known position. Alternatively, if relative position is all that is needed, a given, though otherwise unknown, starting position and orientation of the cameras may be labeled as the coordinate system zero position and orientation and the unique objects identified in the image can then be assigned position and orientation coordinates relative to the zero position, as discussed in more detail below.

The processing subsystem 100 processes the images taken by the one or more cameras 300 at various known relative positions, that is, after moving the cameras from the known starting or, as appropriate, arbitrary starting position in a known and/or measurable manner, as determined by, for example, the INS subsystem 310. From the images, the system determines the relative position and orientation coordinates of identifiable unique objects within the images. As discussed, a given object may be identified by any or all of its shape, color, size, proximity to other objects and so forth. In addition, other information such as a mathematical model or other representation of the building floor plan may be used to describe the relative position and/or orientation of, for example, the wall 107 that supports a given unique object, e.g., the light switch 103, and/or an indication of which side of the wall the object is visible from, to more precisely define the relative positions and orientations of the unique objects within the working environment 104.

As discussed, the position coordinates of a given object are stored in the database 102 along with information identifying the object by pixel patterns, interfaces between respective patterns, and so forth. The database may be arranged non-spatially such that the database is entered using object identification information. The relative position of the object is then an attribute as discussed in more detail below.

The position coordinates are determined initially using cameras 300 with known or calculated interior orientation parameters and, as applicable, boresight parameters. These parameters may be updated during instrument calibration, as needed. The interior orientation parameters may be the focal length, or principal distance, the offset between a point corresponding to the focal length on the image and the center of the image, and lens distortion in the radial and tangential directions. In addition, other known interior orientation parameters may be included to characterize/calibrate the camera, depending on the particular lens and camera, as is understood by those skilled in the art. Known techniques are utilized to calculate the respective interior orientation parameters. The boresight parameters, or external parameters, which are offsets of the camera lens with respect to the inertial system 310 on the machine, or the vehicle frame 302, are also measured or otherwise known prior to the determination of the position and orientation coordinates of the respective unique objects identified in the camera images.

Knowing the relative position and orientation of the camera or cameras 300 and the exterior and interior parameters of the camera or cameras, the system computes the relative position of the unique objects discernable in the images relative to the associated coordinate system. These objects are then "known" objects in the working environment 104, and their position and orientation coordinates as defined within the working environment are stored in the database 102. When one or more cameras 108 of unknown position and orientation later enter the working environment and take images, the system determines the relative position and orientation of the respective cameras based on the location and orientation of the identifiable known objects included within the images taken by the cameras. The system computes the camera positions and orientations in the working environment using resection techniques, such as, colinearity equations, photogrammetric methods, and so forth, in a known manner.

More specifically, using the various calibration parameters of the cameras 300, the position and orientation coordinates of the respective unique objects in the images are determined by processing the camera images to populate the database 102 as described above. To further populates the database, the camera is then moved and new images are taken, and the system then uses the known camera location and orientation information for the respective images and the known camera calibration parameters to compute the position coordinates and, as appropriate, orientation coordinates of newly identified unique objects in the environment and/or to update the position information associated with the known objects in the new images with more precise position information, using, for example, a least square estimation technique in a known manner, and.

Alternatively, when the system has no apriori position information relating to the camera the system may establish an essentially arbitrary (0,0,0) location and orientation (0,0,0) as the position and orientation of the camera 300. The processing system then determines, from the first image or a first set of images taken by the camera 300 and any other associated cameras at the same arbitrary location and orientation, a set of identifiable unique objects in the environment. The objects are assigned an image epoch number, here 1, and stored in the data base. The camera is moved and a second image is taken and objects are identified in the second image. The identified objects are matched against a list of the previously known objects in the database, as part of the initialization of the system. The relative positions of the objects common to both images can then be calculated based on the images and, if known, the movement of the camera between the images. If the positions and orientations of the camera are thus known for the two images, the (x, y, z) coordinates of any points common to both images can be determined using the known intersection method.

Figure 4A:
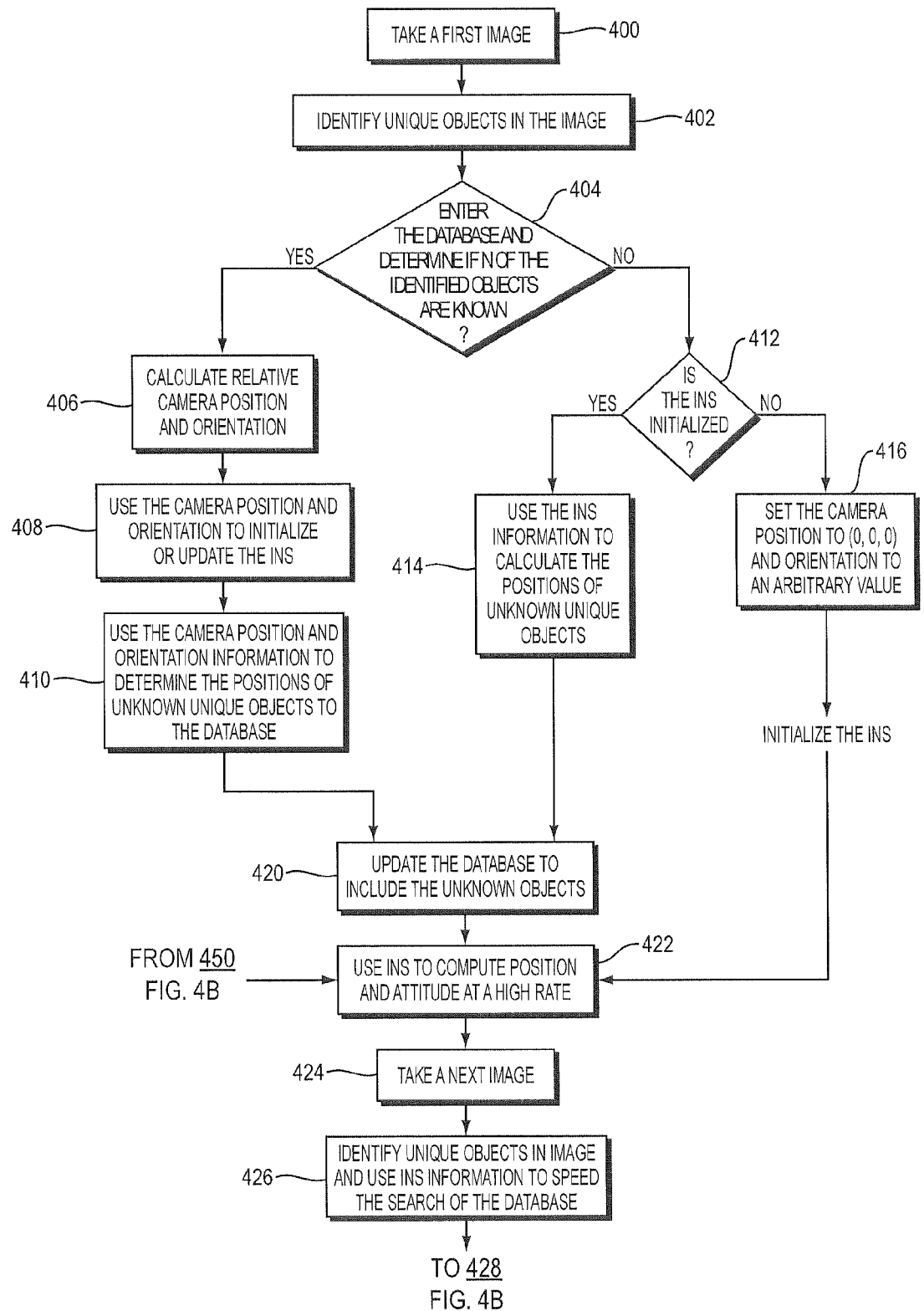
FIGS. 4A and 4B are flow charts of the operations of FIG. 3.
Figure 4B:
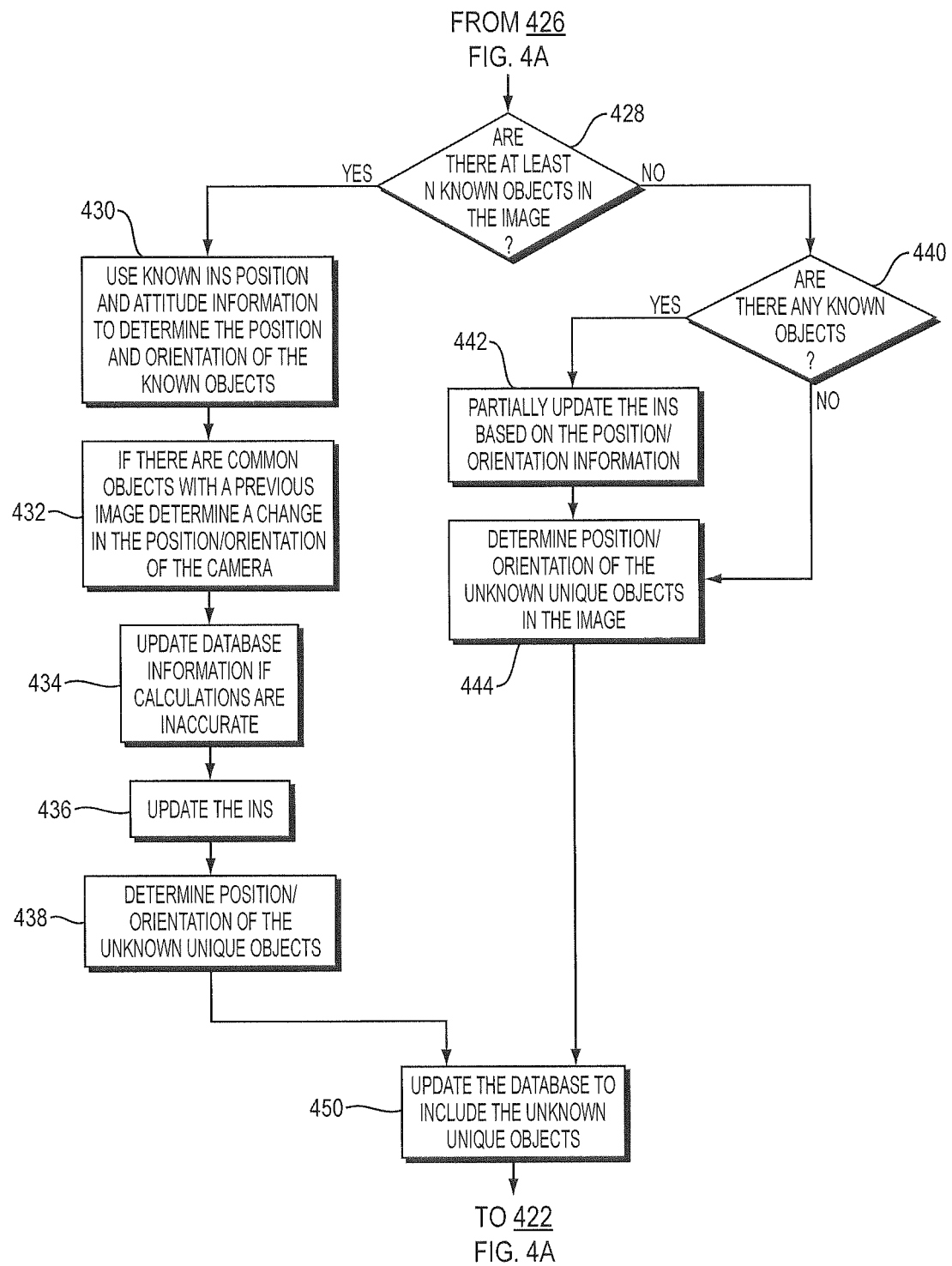

If the camera position and orientation are not known after the movement, there must be a minimum of 6 unique identifiable objects that are common to the two images, and the system computes the relative orientation between the two images. This allows the system to calculate the coordinates of the unique objects and store them into the database. The position and orientation of the new image frame is determined simultaneously. As the system moves again, the same objects are identified, or if they are unavailable, new unique identifiable objects are located (or a combination thereof). The process continues in this manner until the database is populated for the working environment. The minimum number of unique objects can be reduced if the camera images are supplemented with additional position and/or orientation information from other sensors, such as the sensors in the INS subsystem 110. As the data base is being populated and as users also utilize the data base to determine the positions of cameras moving into and within the working environment, the system uses position and orientation information calculated for the respective cameras to, as appropriate, initialize and update INS subsystems associated with the respective cameras and compensate for the drift of the sensors. In between the times the camera position and orientation are determined using the camera images, the system may then use the sensed movement of the camera to determine the precise position and orientation of the camera. The system may also use the INS subsystem position and attitude information for the camera at a new location, to refine or at least speed up the search of the database to determine which, if any, of the identified unique objects in the images are known. As discussed above, the displacement of the INS subsystem from the camera is known, since the camera and the INS subsystem are in known locations relative to a machine measurement frame. Referring now also to FIGS. 4A and 4B, to continue to populate the database and/or to keep the database updated, the operations start with a first image taken by a camera 108, 300 (step 400). The system examines the image and determines unique identifiable objects in the image (step 402). The system enters the database 102 and determines how many of the unique identifiable objects are known. If at least N=3 of the objects are known, the system calculates the position and orientation of the camera within the coordinate system of the working environment 104 based on the locations of the objects in the respective images (steps 404, 406). The system then uses the calculated camera position and orientation to initialize or update, as appropriate, thins subsystem 110 (step 410). If there are unknown unique identifiable objects, the system determines the position and orientation information of the respective unknown objects based on the calculated position and orientation of the camera (step 410). The system next updates the database by including therein entries for the previously unknown unique objects, such that the objects can thereafter be used for machine navigation (step 420).

If the system identifies fewer than N known objects in the image, the system determines if the INS subsystem 110 is initialized (steps 404, 412). If so, the system uses the inertial position and attitude to calculate the position and orientation information for the unknown unique identifiable objects in the image (step 414). Otherwise, in step 416, the system sets the camera position as the zero position (0,0,0) and the camera orientation to an arbitrary orientation, such as (0,0,0) and initializes the INS. The system then calculates the relative positions of the unknown unique objects based on the INS subsystem sensor readings and updates the database by adding the previously unknown objects (steps 418, 420).

In step 420, the database is updated by including, for each new object, information relating to the associated pixel patterns for one or more edges, contours, and so forth, that define the unique object as well as attributes such as color, outline, shape, texture and so forth. In addition, the position and orientation coordinates are included in the database also as an attribute of the object. Alternatively, the database may be spatially arranged with the types of objects as attributes.

As the camera moves through the working environment, the system uses the INS subsystem 110 to compute new positions and orientations of the camera at a relatively high rate (step 422). At a predetermined time, the camera also takes a next image and identifies unique identifiable objects in the image. Using the INS subsystem position and attitude information for the camera, the system is able to refine or at least speed up its search of the database to determine which, if any, of the identified unique objects are known (steps 424, 426). If at least N unique objects in the image are known, the system calculates the position and orientation of the camera based on the stored position and orientation information for the known objects.

For quality control, the system also calculates the position and orientation coordinates for the known objects based on the position and orientation of the camera as determined using the INS measurements. If there are N known objects common to both this image and the previous image, the system also calculates a change in position and orientation of the camera between the two images based on the stored position and orientation coordinates of the known objects (steps 430, 432). The system then uses the calculated and stored position and orientation information relating to the known objects and the INS-based camera positions and orientations to determine if the stored position information for the respective known objects should be updated using the more precise position information. Further, the system uses the information to update the INS, to correct for drift (steps 434, 436, 438). The system also determines the positions and orientations of previously unknown unique objects in the most recent image based on the updated camera position and orientation information (steps 450).

If there are some but fewer than N known objects identified in the image, the system uses the stored position and orientation information for the identified known objects to partially update the INS subsystem (steps 440, 442). The system then determines the relative positions and orientations of the known and unknown unique objects identified in the image based on a camera position and orientation as determined from the updated INS information (step 444). If no known objects are identified in the image, the system uses the INS information, without updating, to determine the position and orientation of the camera and the relative positions and orientations of the unknown unique objects in the image (steps 440, 444).

The system then updates the database with the previously unknown unique objects. As appropriate, the system also updates the stored coordinates of previously known objects with the newly calculated values if the calculated position information is more precise (steps 450). The system determines that the new position information is more precise if, for example, the new position information is based on recently available GNSS position information from an associated GNSS receiver, and/or if the position is determined using information from a greater number of images and so forth. The system then continues navigating through the working environment and updating the database and so forth (return to step 422).

The database may be established from an unknown camera starting position as discussed above or from a known camera starting position. The camera positions corresponding to the images may be determined with the aid of GNSS information or information from total stations, and so forth or based on an arbitrary scale. However, once the database is populated, an unknown position and orientation of a camera within the coordinate system of the working environment can be determined solely from one or more images taken by the camera, without any a priori knowledge of the location or orientation of the camera, as long as the internal characteristics of the camera are known.

As discussed, the system identifies the respective unique objects in images taken from a plurality of camera positions, and determines the locations of the unique objects in each of the images. The system uses 3-dimensional triangulation to calculate the position coordinates of the unique objects and, as appropriate, attitudes or orientations of the respective unique objects consisting of a composite of features, based on the locations of the respective objects in the images, and the relative positions and orientations of the camera or cameras that produced the images. The system adds the unique identified objects to the database by including therein the attributes detected in the images and, also as an attribute, the calculated position coordinates and attitude information. The system repeats these steps, identifying unique objects in the images taken from other camera locations within the working environment and populates the database accordingly.

The cameras may be moved to locations that correspond to directions that a machine or a person typically enters and/or moves within the working environment. In this way, the database is populated with objects as seen from the various directions. The views of the objects from different directions may, but need not, be reconciled in the sense that a correspondence be found between views of the objects from, for example, a camera facing north and a camera facing south. Rather, the same object may be indentified differently in the north view and the south view, without adversely affecting the determination of the position and orientation of the camera based on images taken by the camera. Further, information identifying the direction from which the object is visible may be used in conjunction with a map or model of the floor plan, to determine the new relative position of the camera with greater accuracy.

Figure 5A:
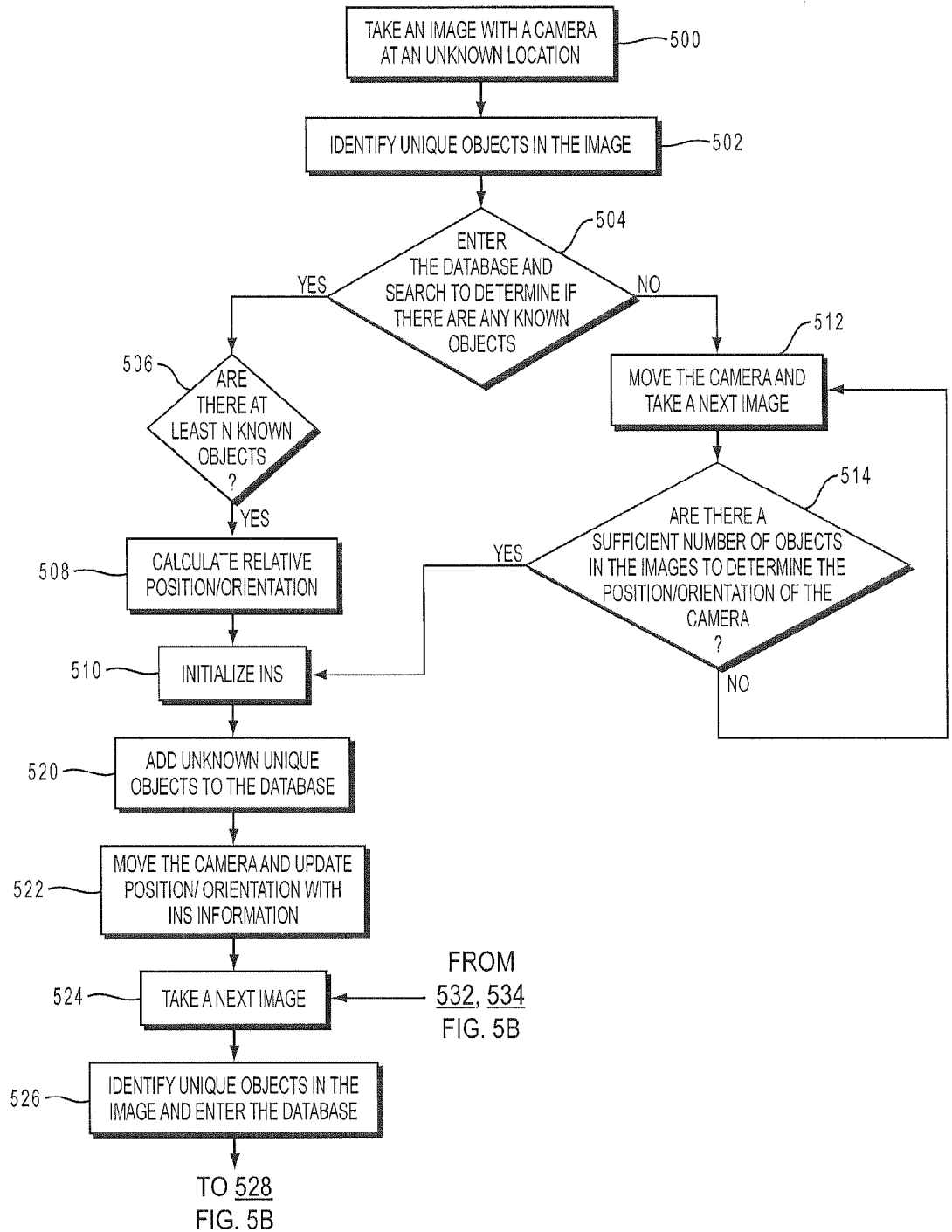
FIGS. 5A and 5B are flow charts of the operations involving a camera of unknown location.
Figure 5B:
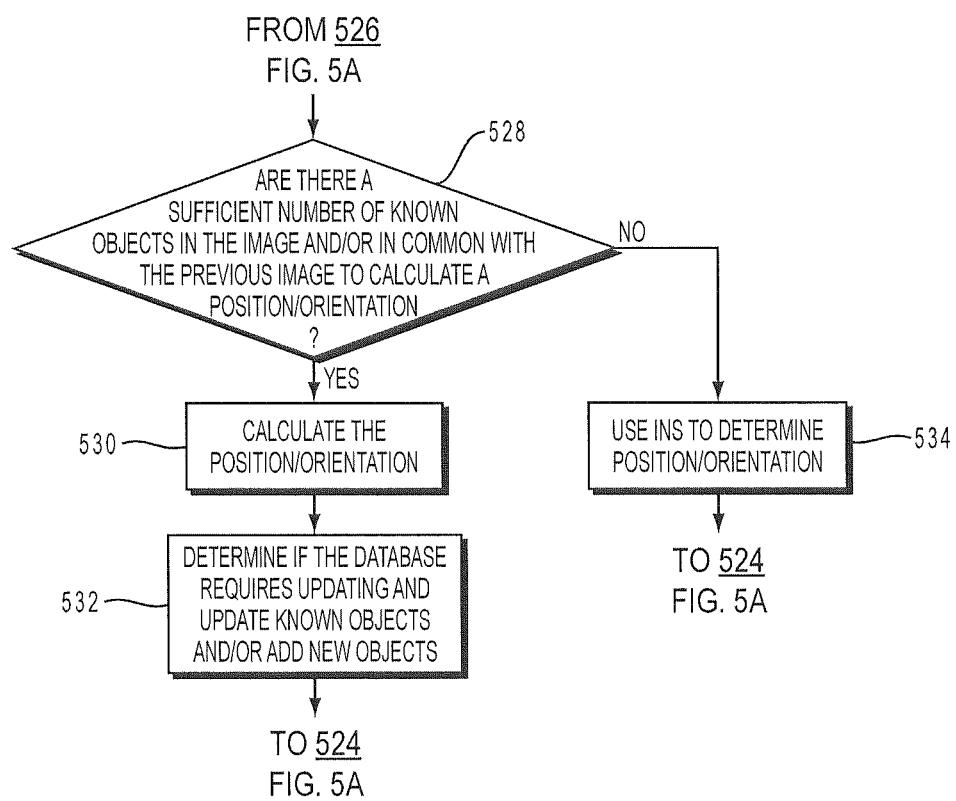

Referring now to FIGS. 5A and 5B, a camera 108 with no a priori position information takes an image within the working environment 104 (step 500). The processing subsystem 100 processes the image (step 502) and identifies unique objects in the image. The system then enters the database 102 and determines how many of the identified unique objects are known (step 504).

If a sufficient number of the unique objects identified in the image are known, the system uses the corresponding stored position and, as appropriate, orientation coordinates to calculate an estimated initial position and orientation for the camera 108 through triangulation (steps 506, 508). If fewer than the number of unique objects required to determine position and orientation are found in the data base, i.e., are known objects, the system continues processing one or more next images taken by the camera in slightly different positions or orientations until a sufficient number of known objects are identified in the images and an initial position and orientation can be calculated (step 514).

The system then initializes the INS subsystem with the calculated initial position and orientation (step 510). Also, as appropriate, the system may add previously unknown objects to the database (step 520).

The camera, now with an estimated location and orientation within the working environment 104, moves and takes a next image and the system processes the image and identifies unique objects therein. The system enters the database and determines which, if any, of the identified unique objects are known (steps 526, 528). The system may then determine the current position of the camera from a single image if a sufficient number of the objects are known. In addition, or instead, the system determines if there are known objects in common with the previous images taken by the camera, and the system then uses the position information from the database for the common objects in the calculations to determine the current position of the camera (step 530).

Using information from the INS subsystem 110, the system may separately calculate the estimated position and orientation of the camera based on the previously estimated position and orientation and the sensed movement of the camera. The system may then, as appropriate, update the database to include unknown objects from the images and/or update the stored position information for the known objects in database the manner discussed above (step 532).

Other camera configurations may be used to populate the database. For example, a plurality of cameras pointing in all directions may be utilized. The cameras may be situated on a frame that moves through the working environment, such that sets of images are taken in all directions at once in the various locations. The frame preferably includes positioning and orientation instrumentation, such as, for example, GNSS and/or INS, such that the changes to the positions and orientations of the respective cameras are readily available and can thus be associated with the respective images produced by the plurality of cameras. The cameras may, for example, be high resolution video cameras. As discussed, the system may then, but need not, associate attributes of the different views of the same unique object in the database. Thereafter, positions and orientations for cameras without GNSS and/or INS information can be readily determined from the images taken by the camera.

The system may be used in an environment that changes over time and/or based on the operations of the machine or person carrying the camera, with the database being updated with position and orientation information for changed, and thus, unknown, unique objects that are viewed by the camera. For example, the system may have cameras 108 strategically located to take forward, backward and/or sideways images of a field being plowed by a machine 106. For a given pass of the plow, certain of the cameras take images of landscape that is not changed and other cameras take images of landscape that is changing, i.e., by being plowed up, during the given pass. The database is updated to include as new objects the changed unique features and composite features that are newly identified, and the position coordinates and orientations of the changed features and composite features are determined based on the known coordinates of previously known unique objects that are identified in the same images.

The system continues to determine the position and/or orientation of the machine 106 based on the camera images over a next pass, based on the unique objects that are known from the previous and earlier passes i.e., the previously plowed areas and the areas, that remain unplowed and adds to the database the unknown objects that are identified in the various images taken in the current pass by the cameras facing forward, backward and/or sideways, as appropriate. In the images, the edge of the plowing is readily discernable, and thus, the relative lane positioning of the machine, as well as the precise position along the lane, can be determined based on the respective images as the machine moves over the field. The determination of relative position using the images from the various cameras and the updating of the database with the new, altered objects as the environment changes is particularly useful since many if not all of the known objects in previous images of the unplowed field may change as work progresses over the environment.

The system may be used to determine the location of a camera 108 when no other location information is available—i.e., no GNSS position information, no cell phone location information and so forth. Thus, as discussed above, a camera with no a priori location information takes a number of images of its location by changing the camera angle or otherwise moving the camera slightly between images. The system then identifies unique objects, such as the windows of a building, signs on or near the building, and so forth, until the location of the camera can be precisely determined from the information in the database. For example, the camera may take images of a house and the system uses the shape and color of the house as well as the placement and shapes of windows, fences and so forth, to essentially eliminate as possibilities large numbers of houses and ultimately narrows the search to a relatively small number of possible houses in a particular geographic location. Using additional unique objects in the same or additional images, the system ultimately determines the relative position of the camera in the working environment 104.

As discussed earlier, the environment 104 may also be augmented to allow for faster location of a camera within a given environment. For example, stickers may be applied in strategic positions along a corridor, within a warehouse, and so forth, to provide additional objects for inclusion in the database. Further, different stickers may be utilized on different corridors, or different floors to readily determine at least one aspect of the camera location, such as, a single reference observation of elevation. This is particularly useful in an environment in which various floors may be similarly outfitted, i.e. have identical floor plans, fixture layouts, and so forth.

Other uniquely identifiable objects of interest may be views out of the windows, and so forth, which also distinguish the building floors by elevation. Further, object information may be utilized to determine the pointing angle of the camera and adjustments made to find particular desired location-related information, such as, a building marquee or other sign on a building, or building corner, a street sign, and so forth. Multiple known unique objects associated with, for example, the building marquee, may then be utilized to determine the position and orientation of the camera.

If any location information is known apriori or calculated from GNSS and/or INS information or other positioning information, the information is utilized along with the attributes of the known objects to determine a precise location within the working environment. For example, if elevation is known from a sensor, the elevation information is utilized to determine what building floor the camera is on, assuming elevation is one of the attributes listed in the database. If not, the elevation may be added to the database once the position of the camera is determined from the images.

While known mapping systems may provide images of a given location to a user, the location is known or specified beforehand. In this system, the location is not known and is determined from the images alone.

As discussed above, multiple users may have access to the database associated with a given working environment. Thus, a camera with no apriori location information can determine its current location based solely on identifying known unique objects and/or particular features of discernable areas that together provide at least 7 observations in the images taken at the vehicle location. Also, the images taken by every camera in the working environment may be processed to update the database, such that changes in the working environment are incorporated into the database as the vehicles operate within the working environment. Further, position information determined for any of the cameras may be used, as discussed above, to update the data base with improved the position information.

The database may also be created, used and updated in conjunction with GNSS position information from an associated GNSS receiver and/or sensor readings from an INS subsystem or other sensor information whenever the information is available. Thus, as cameras that are equipped or associated with GNSS receivers and/or INS subsystems or other sensors move within the working environment, the database information may be updated to include more precise position information for known as well as newly added unique objects. Thereafter, camera that are not associated with GNSS receivers and/or INS subsystems have the benefit of the more precise location information as the cameras operate within the working environment. Also, cameras that are equipped or associated with GNSS receivers but move to locations in which the GNSS satellite signals are not available may use the position information in the database to update their positions and orientations as the cameras move, and thus, allow the GNSS receivers to quickly acquire the GNSS signals when the vehicle are in a location within the working environment in which the GNSS signals are available.

What is claimed is:

1. A positioning system including
a database that associates, with visually identifiable unique objects in a working environment, position coordinates within an associated coordinate system;
one or more cameras of known internal characteristics and unknown positions, movements, or both within the environment, the one or more cameras taking one or more images of the environment from respective positions;
a processing subsystem for
identifying unique objects within one or more of the images taken by a given camera;
determining if at least three unique objects are identified within the one or more images taken by the given camera;
based on determining that the at least the three unique objects are identified within the one or more images taken by the given camera;
(1) entering the database to extract position coordinates associated with the at least three unique objects that match entries in the database, and
(2) determining position and orientation of the given camera in the environment based on the retrieved position coordinates for the at least three unique objects;
based on determining that the at least three unique objects are not identified within the one or more images taken by the given camera, processing one or more additional images to identify the at least three unique objects; and
updating the database to include one or both of information relating to newly identified unique objects in the one or more images taken by the respective cameras, the information including the position coordinates for the newly identified objects as determined from the images taken by the cameras and more precise position coordinates for previously identified objects.

2. The positioning system of claim 1 wherein the database further includes orientation coordinates for the identifiable unique objects that are composites of other unique objects, and the orientation coordinates are updated when the associated position coordinates are updated.

3. The positioning system of claim 2 wherein the database is empty when the one or more cameras take a first image and the processing subsystem populates the database to include the position coordinates, the orientation coordinates, or both, relating to identified unique objects in the first image and next images taken by the one or more cameras.

4. The positioning system of claim 3 wherein
the database further associates with the identified unique objects attributes of the identified objects that are determined from the images.

5. The positioning system of claim 1 wherein the position coordinates of the identified unique objects are calculated by 3-dimensional triangulation based on the images taken by the one or more cameras.

6. The positioning system of claim 1 wherein the processing subsystem processes altered unique objects as the newly identified unique objects.

7. The positioning system of claim 1 wherein the system utilizes information from maps, floor plans and combinations thereof and associates with the database entry of a unique object a description of where the unique object is visible from within the map, floor plans and combinations thereof.

8. The positioning system of claim 7, wherein the description of where the unique object is on a wall consists of a mathematical description of a plane and a side of the plane from which the object is visible.

9. The positioning system of claim 8, wherein the camera moves in directions of traffic flow in the environment to take the images.

10. The positioning system of claim 6 wherein the system includes in the database as observations known reference information about the environment.

11. The positioning system of claim 10 wherein the reference information is one or more of elevations of respective floors, elevations of defined areas within the environment, pointing directions of views from windows, pointing directions based on visibility of features located on walls, relative locations of walls, windows and other features of a floor plan.

12. The positioning system of claim 1 wherein a position and orientation of the camera for a first image are set to arbitrary values and positions and orientations of the unique objects are determined relative to the arbitrary values.

13. The positioning system of claim 12 further including
an uncalibrated inertial measurement unit (IMU), and
the one or more processors determine a gravity vector based on readings of the IMU and provide an orientation reference to the working environment.

14. The positioning system of claim 1 wherein the one or more processors identify within the images unique strategically placed objects that are associated in the database with known observations, the one or more processors use the known observations in calculations to determine position and orientation of the camera.

15. The positioning system of claim 14 wherein the unique strategically placed objects correspond to one or more of different elevations and different pointing directions.

16. The positioning system of claim 1 wherein the one or more processors determine the unknown movement of the camera to a next position and orientation based on the images taken before and after the movement.

17. The positioning system of claim 16 further including
an inertial measurement subsystem associated with a given camera,
the one or more processors calibrate and update the inertial measurement subsystem based on the determination of position and orientation of the given camera using the images, and
the one or more processors use information from the inertial measurement system to determine camera position and orientation in between times the one or more processors process the images to determine camera position and orientation.

18. The positioning system of claim 2 wherein a given camera is associated with a Global Navigation Satellite System (GNSS) receiver and GNSS position and orientation information is used by the processing subsystem to determine position and orientation information for identified unique objects, update position and orientation information for the identified unique objects, or both.

19. The positioning system of claim 18 wherein
the given camera is further associated with an inertial measurement system, and
the processing subsystem initializes and updates the inertial measurement subsystem using the position and orientation of the given camera as determined by the system and uses information from the inertial measurement subsystem to determine position and orientation information for the given camera based on sensed movement.

* * * * *